United States Patent
Sang et al.

(10) Patent No.: US 11,958,396 B2
(45) Date of Patent: Apr. 16, 2024

(54) HIDDEN TYPE HOLDER DEVICE, VEHICLE ARMREST INCLUDING HOLDER DEVICE, AND TRANSPORTATION MEANS INCLUDING THE SAME

(71) Applicants: Hyundai Motor Company, Seoul (KR); Kia Corporation, Seoul (KR); Nifco Korea Inc., Asan-si (KR); Seoyon E-Hwa Co., Ltd., Anyang-si (KR)

(72) Inventors: Chun Lei Sang, Yantai (CN); Cheng Kun Li, Yantai (CN); Won Young Bae, Seoul (KR); Bong Ju Choi, Anyang-si (KR); Dae Kyo Kim, Asan-si (KR)

(73) Assignees: Hyundai Motor Company, Seoul (KR); Kia Corporation, Seoul (KR); Nifco Korea Inc., Asan-si (KR); Seoyon E-Hwa Co., Ltd., Anyang-si (KR)

( * ) Notice: Subject to any disclaimer, the term of this patent is extended or adjusted under 35 U.S.C. 154(b) by 255 days.

(21) Appl. No.: 17/534,278

(22) Filed: Nov. 23, 2021

(65) Prior Publication Data
US 2022/0340067 A1 Oct. 27, 2022

(30) Foreign Application Priority Data
Apr. 25, 2021 (CN) .......................... 202110448662.5

(51) Int. Cl.
*B60N 3/10* (2006.01)
*B60N 2/75* (2018.01)

(52) U.S. Cl.
CPC ............. *B60N 3/102* (2013.01); *B60N 2/793* (2018.02)

(58) Field of Classification Search
CPC ............................... B60N 3/102; B60N 2/793
See application file for complete search history.

(56) References Cited

U.S. PATENT DOCUMENTS

| | | | | |
|---|---|---|---|---|
| 5,228,611 A * | 7/1993 | Yabuya | ............... | B60N 3/102 312/319.1 |
| 6,779,769 B1 * | 8/2004 | York | ............... | B60N 3/106 248/311.2 |
| 8,708,408 B2 * | 4/2014 | Andersson | ............... | B60N 3/102 297/188.17 |
| 9,102,277 B2 * | 8/2015 | Okuhara | ............... | B60N 2/757 |
| 9,211,828 B2 * | 12/2015 | Masuda | ............... | B60N 3/102 |
| 10,239,434 B2 * | 3/2019 | Gomez | ............... | B60N 2/793 |
| 2004/0217248 A1 * | 11/2004 | Bieck | ............... | B60N 3/102 248/311.2 |
| 2016/0362029 A1 * | 12/2016 | Masatsugu | ............... | B60N 3/102 |

* cited by examiner

*Primary Examiner* — Anita M King
(74) *Attorney, Agent, or Firm* — MORGAN, LEWIS & BOCKIUS LLP

(57) ABSTRACT

A hidden type holder device includes: a stationary assembly, a movable assembly, and a first return spring, the movable assembly is accommodated in the stationary assembly and movable to the inside or outside of the stationary assembly, the movable assembly has a retractable holder assembly for accommodating an article, and two opposite end portions of the return spring are respectively mounted on the stationary assembly and the movable assembly.

19 Claims, 25 Drawing Sheets

HIDDEN TYPE HOLDER DEVICE, VEHICLE ARMREST INCLUDING HOLDER DEVICE, AND TRANSPORTATION MEANS INCLUDING THE SAME

CROSS-REFERENCE TO RELATED APPLICATION

The present application claims priority to Chinese Patent Application No. 202110448662.5 filed in the Chinese National Intellectual Property Administration on Apr. 25, 2021, the entire contents of which is incorporated herein for all purposes by this reference.

BACKGROUND OF THE INVENTION

Field of the Invention

The present invention relates to a hidden type holder for storing an article, and more particularly, to a hidden type holder used for transportation means.

Description of Related Art

To meet the needs of people holding articles in transportation means (e.g., vehicles, trains, passenger ships, and airplanes), devices, which may be conveniently used, may be provided in the vicinity of passenger seats. For example, a holder capable of holding a beverage container is provided in a vehicle.

The holder may be a holder provided on an armrest between a driver seat and a passenger seat. A driver or a passenger may mount various types of beverage containers (e.g., can containers, bottles, and cups) in the holder.

A holder in the related art is generally configured as a single holder or a twin holder having an accommodation portion with an approximately cylindrical shape. Furthermore, the holder generally includes a plurality of fingers or holding elements to mount a beverage container having a diameter smaller than an overall diameter of the accommodation portion.

A retractable holder has been provided to save space and keep the vehicle clean, and a hidden type holder may be designed. That is, the holder is retracted when not in use, and the holder is extended when used.

However, the holder has several problems. For example, because a cup or a water bottle has a predetermined height, the holder needs to have a predetermined height to stably support the cup or the water bottle. However, because a space in the vehicle or the armrest is limited, the holder occupies a large space when the height of the holder is too large, which is disadvantageous in designing the armrest. In contrast, if the holder does not have a sufficient height, stability of the holder deteriorates.

Furthermore, in the case of the holder in the related art, only a person, who is accommodated next to the holder, can use the holder, but a person, who is accommodated behind the holder, cannot use the holder. For example, the holder positioned on a central console in a front row in the vehicle may be used only by a driver and a passenger accommodated in a front passenger seat, but the holder cannot be used by a passenger accommodated in a rear seat.

To solve the problems associated with the hidden type holder in the related art, the hidden type holder may be fixed to the rotatable device. However, when the hidden type holder is rotated by 180 degrees in a forward/rearward direction by the rotatable device, the positions of the bottom and top portions of the hidden type holder are reversed after the rotation of the hidden type holder, which makes it impossible to accommodate the cup. Therefore, the person accommodated in the rear seat cannot use the hidden type holder in the related art.

Therefore, there is a need to further improve the holder in the related art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a holder apparatus configured for ensuring use stability of a holder while maintaining a small height of the holder.

The present invention, in various aspects thereof, has further been made in an effort to provide a holder apparatus which may be used by passengers accommodated in front and rear seats, providing convenience for the passengers.

Various aspects of the present invention are directed to providing a holder apparatus including: a stationary assembly, a movable assembly, and a first return spring, wherein the movable assembly is accommodated in the stationary assembly and movable to the inside or outside of the stationary assembly, wherein the movable assembly has a retractable holder assembly for accommodating an article, and wherein first and second end portions of the first return spring are mounted on the stationary assembly and the movable assembly, respectively.

The stationary assembly may include stationary covers, rails, and racks, the stationary covers may include an upper cover and a lower cover, the upper cover and the lower cover may cooperatively form a housing for accommodating the movable assembly, an opening may be provided at a front end portion of the housing, the movable assembly may move to the inside or outside of the housing through the opening, and the rail may guide the movement of the movable assembly.

The rails may include a first rail and a second rail, the first rail and the second rail may be provided at lateral sides of the upper cover, the racks may be provided on at least one side of the lower cover, the rail may include a rail groove, the movable assembly may have a guide block, and the guide block may be disposed in the rail groove.

The stationary assembly may further include a rotation stopper for restricting an angle at which the stationary assembly is reversed in a forward/rearward direction thereof.

A first end portion of the first return spring may be provided at a rear side of the movable assembly, a second end portion of the first return spring may be provided at a front side of the stationary assembly, and elasticity of the first return spring may push the movable assembly forward to move the movable assembly to the outside of the stationary assembly.

The movable assembly may include a movable housing, a power transmission device, and the retractable holder assembly, and when the movable assembly moves forward or rearward thereof, the power transmission device may transmit power to the retractable holder assembly.

The movable housing may include an upper movable cover and a lower movable cover, and the power transmission device and the retractable holder assembly may be accommodated in the movable housing.

The power transmission device may include a movable gear, a rotation gear, and a ring gear, the movable gear may engage with a first rack positioned on the stationary assembly, the ring gear may be provided on a holder body of the retractable holder assembly, and the rotation gear may be located between the movable gear and the ring gear.

The movable assembly may further include a balance gear, the balance gear may engage with a second rack positioned on the stationary assembly, and the second rack may be positioned at a position on the stationary assembly opposite to the first rack.

The movable assembly may further include an endplate, and the endplate may be positioned at a front end portion of the movable assembly.

The retractable holder assembly may include a holder body, a ring gear, and retractable portions, the holder body may be a hollow body, the ring gear may be disposed around an external periphery of a holder body and coupled to the power transmission device to rotate the holder body, the retractable portion may be movable upward or downward relative to the holder body, and when the movable assembly moves forward, the holder body may move the retractable portion upward or downward by being rotated by power transmitted from the power transmission device.

The holder body may have guide grooves, the retractable portions may have guide pins, the guide pins may be disposed in the guide grooves, and when the holder body rotates, the guide pins and the guide grooves may be coupled to move the retractable portions in an upward direction or a downward direction thereof.

The guide groove may include a horizontal portion and an inclined portion, and the inclined portion may be positioned at an end portion of the horizontal portion and inclined from the end portion of the horizontal portion.

The retractable portions may include an upper retractable portion and a lower retractable portion, the upper retractable portion may be positioned above the holder body and movable upward, the lower retractable portion may be positioned below the holder body and movable downward, the guide grooves may include an upper guide groove and a lower guide groove, the inclined portion of the upper guide groove may be inclined upward, and the inclined portion of the lower guide groove may be inclined downward.

The retractable portion may include a folding flap.

The folding flap may have a stopper and a second return spring.

The second spring may include an upper return spring and a lower return spring.

The upper retractable portion may include an upper folding flap, the upper folding flap may be bent downward and positioned at a horizontal position by upward elasticity of the upper return spring, the lower retractable portion may include a lower folding flap, and the lower folding flap may be bent upward and positioned at a horizontal position by downward elasticity of the lower return spring.

The movable housing may have a sliding groove, and the holder body may be mounted in the sliding groove and rotatable relative to the sliding groove.

The holder apparatus may further include a locking device, the locking device may include a locking pin and a locking groove, the locking pin may be provided on one of the stationary assembly and the movable assembly, and the locking groove may be provided on a remaining one of the stationary assembly and the movable assembly.

The holder apparatus may further include a turning assembly, and the turning assembly may turn the stationary assembly forward or rearward thereof.

Various aspects of the present invention are directed to providing a vehicle armrest including the hidden type holder device.

Various aspects of the present invention are directed to providing a transportation means including the hidden type holder device.

In comparison with the related art, the holder apparatus according to the exemplary embodiment of the present invention may have the following advantageous effects.

All the passengers accommodated in the front and rear seats can use the holder device. Since the holder device is mounted on the single rotational structure, the passengers accommodated in the front and rear seats conveniently use the holder device.

The endplate of the holder device may be used to support and clamp the cup, which makes it possible to prevent the motion of the cup, reduce noise caused by a collision between a cup and other components, and prevent a liquid in the cup from swaying and overflowing.

The support length of the holder device may be adjusted, which makes it possible to decrease the distance between the retractable portions when the movable assembly is accommodated and the holder device is closed, and increase the distance between the retractable portions when the cup is placed, stability of the cup.

The holder device may minimize a required space when the movable assembly is accommodated and the holder device is closed such that the holder device is advantageous in setting the space in the vehicle and the good external appearance may be implemented.

The method and device according to various exemplary embodiments of the present invention may have other features and advantages, and these features and advantages will become clear from the accompanying drawings and the following embodiments or described in detail with reference to the accompanying drawings and the following embodiments. These drawings and embodiments are all intended to interpret the specific principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A and FIG. 1B are schematic views of a hidden type holder generally, in which FIG. 1A is a schematic view exemplarily illustrating a state in which the holder is closed, and FIG. 1B is a schematic view exemplarily illustrating a state in which the holder is opened.

Unless otherwise separately described, the same reference numerals indicate the same or equivalent elements.

Figure 1A:
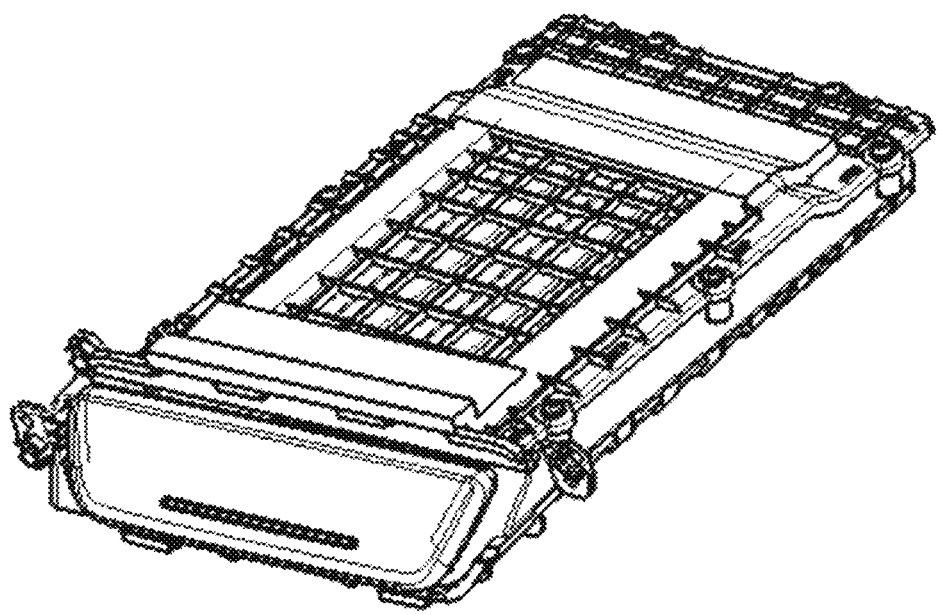
Figure 1B:
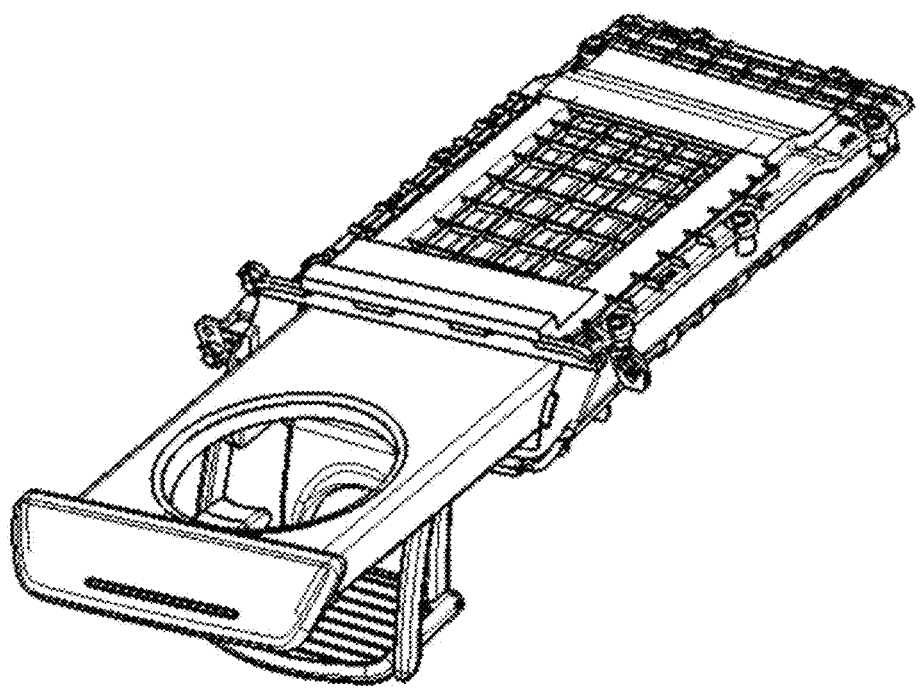
Figure 2:
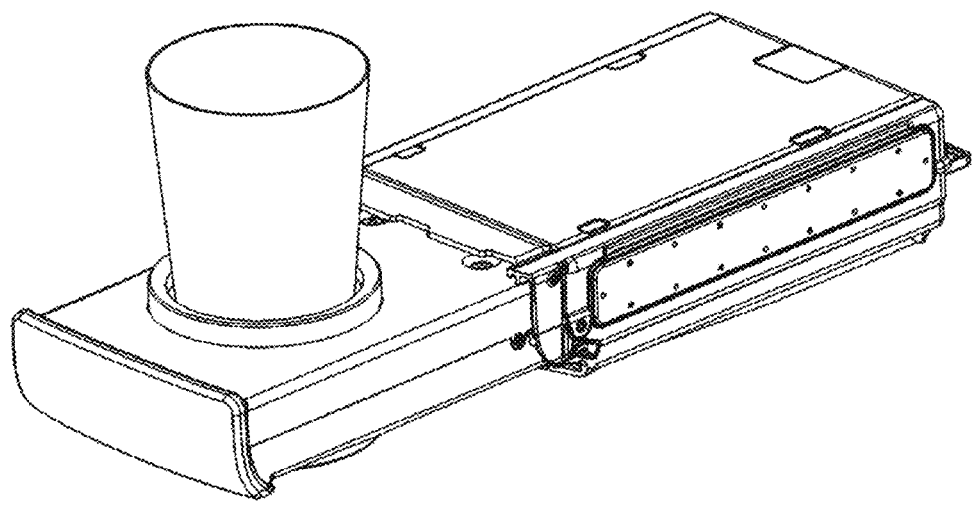
FIG. 2 is a schematic view exemplarily illustrating a state in which the hidden type holder in the related art is used.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The present invention relates to a hidden type holder device, and the holder device may be positioned on an armrest of a transportation means. Furthermore, the holder device may be mounted on one rotatable device (e.g., an armrest of a vehicle). Persons accommodated in front and rear seats may use the holder device by rotating the rotatable device.

Hereinafter, the hidden type holder device according to the exemplary embodiment of the present invention will be described in detail with reference to FIGS. 3 to 24.

Figure 3:
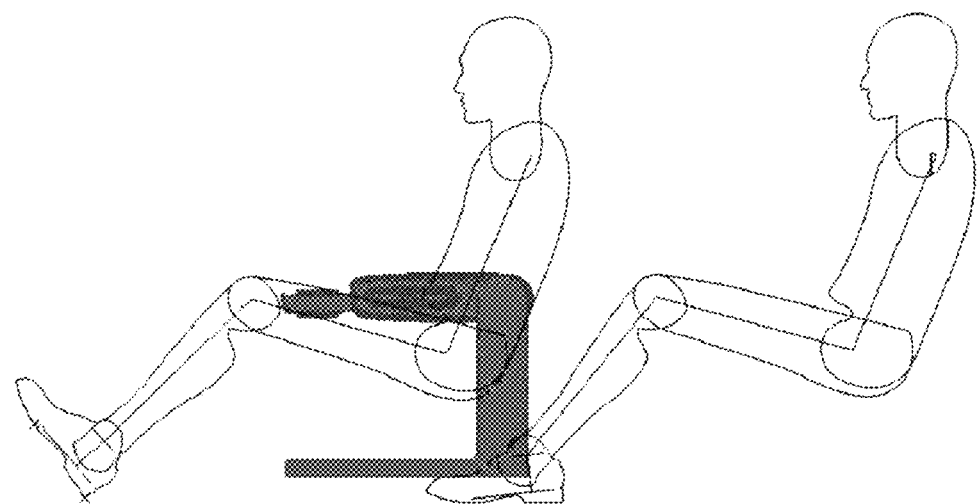
FIG. 3 is a schematic view exemplarily illustrating a state in which a hidden type holder device according to various exemplary embodiments of the present invention are used, and illustrating a state in which the hidden type holder device is used by a passenger accommodated in a front seat.
Figure 4:
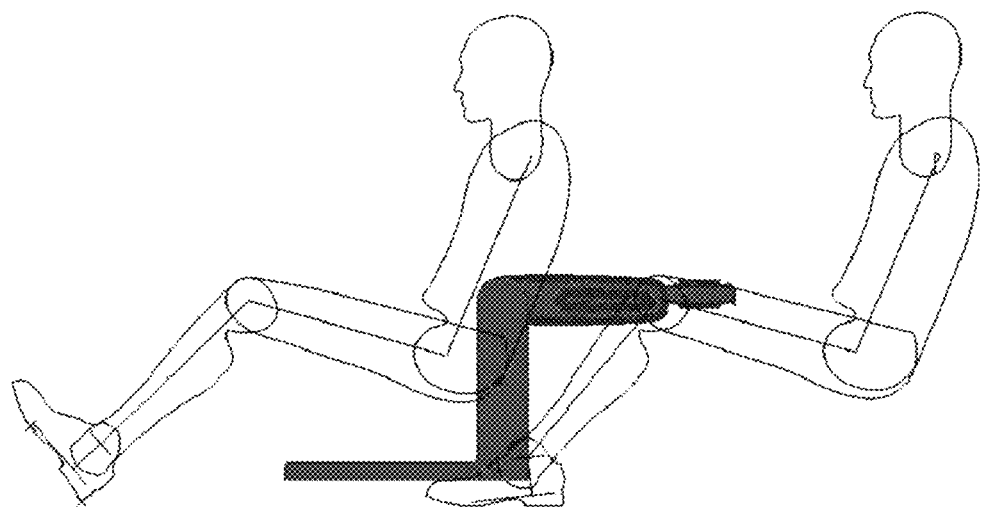
FIG. 4 is a schematic view exemplarily illustrating a state in which the hidden type holder device according to the exemplary embodiment of the present invention is used, and illustrating a state in which the hidden type holder device is used by a passenger accommodated in a rear seat.
Figure 5:
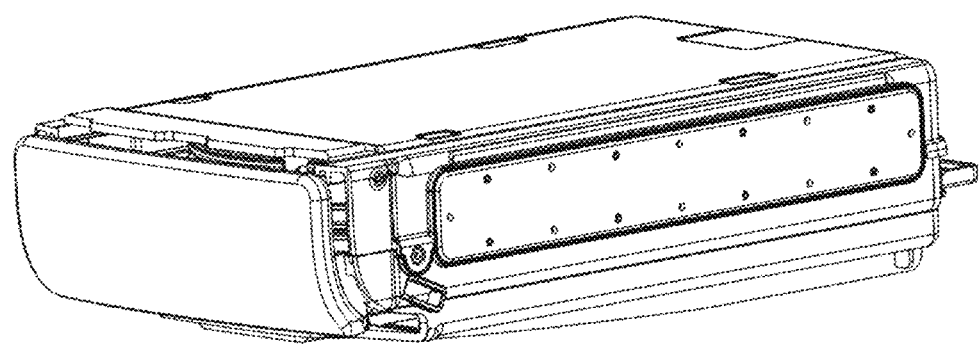
FIG. 5 is a perspective view exemplarily illustrating a state in which the hidden type holder device according to the exemplary embodiment of the present invention is closed.
Figure 6:
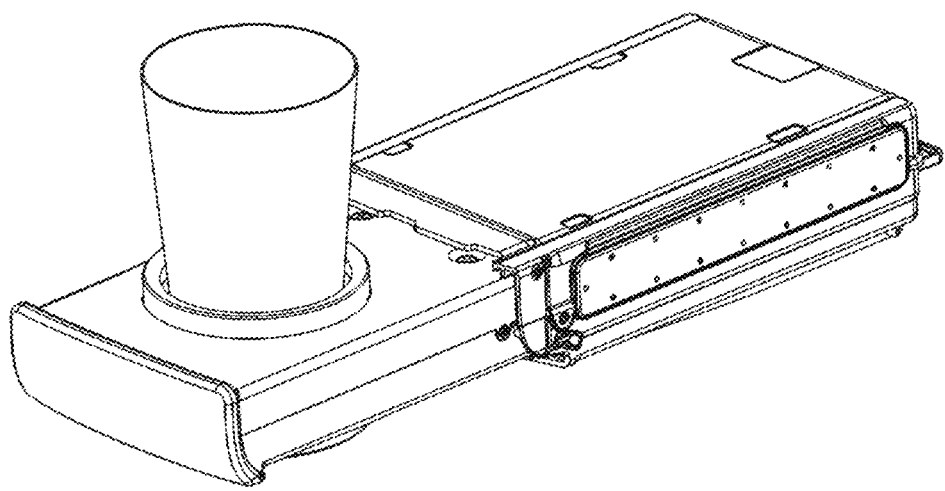
FIG. 6 is a perspective view exemplarily illustrating a state in which the hidden type holder device according to the exemplary embodiment of the present invention is opened forward.
Figure 7:
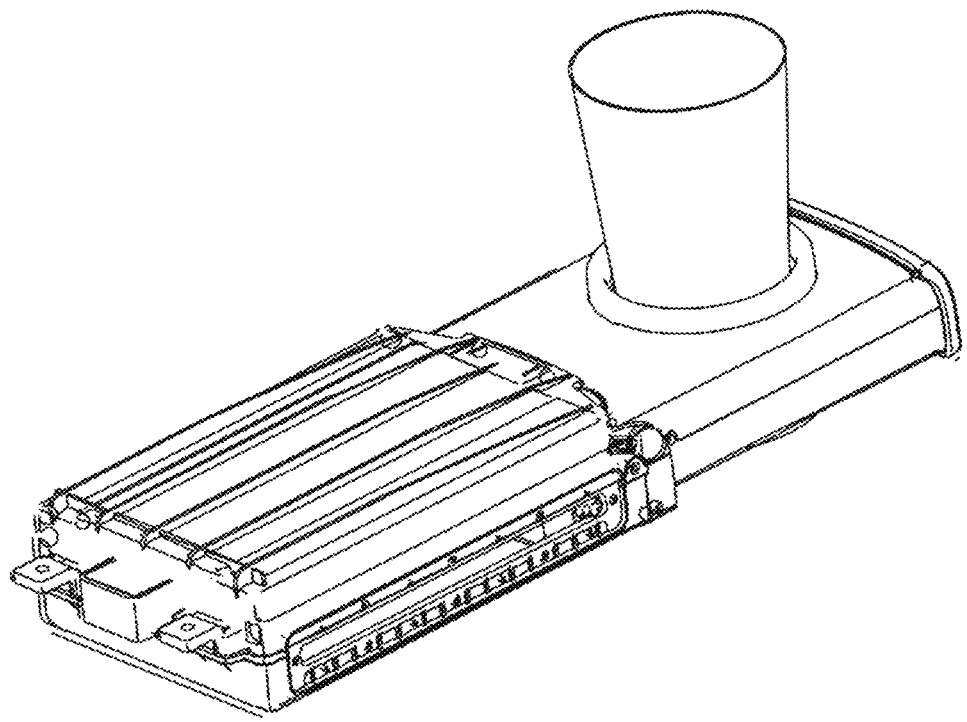
FIG. 7 is a perspective view exemplarily illustrating a state in which the hidden type holder device according to the exemplary embodiment of the present invention is opened rearward.
Figure 8:
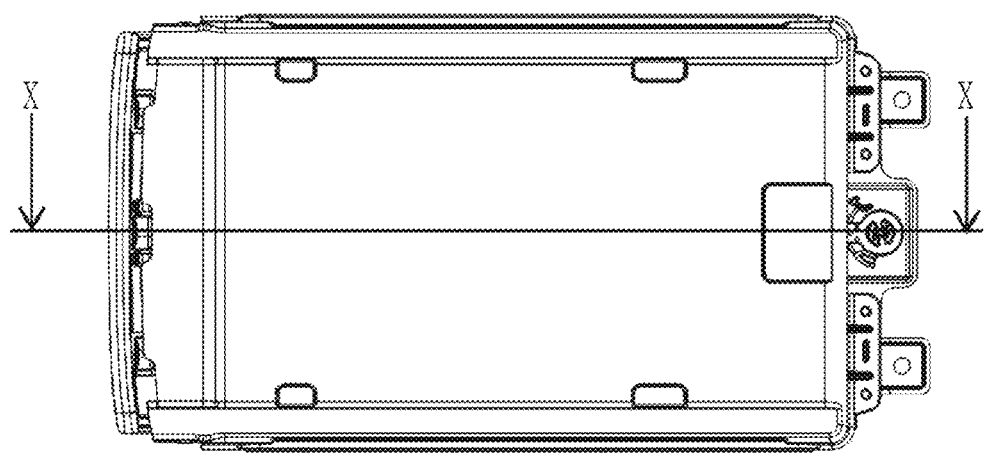
FIG. 8 is a top plan view exemplarily illustrating the hidden type holder device according to the exemplary embodiment of the present invention.

As illustrated in FIG. 3 and FIG. 4, the hidden type holder device according to the exemplary embodiment of the present invention may have a holder assembly which may be hidden and mounted on an armrest of a front seat of a vehicle. The armrest may rotate forward and rearward (see FIG. 3 and FIG. 4), and the holder device may be extended from the armrest and retracted, which enables passengers accommodated in the front and rear seats to use the holder device.

Figure 9:
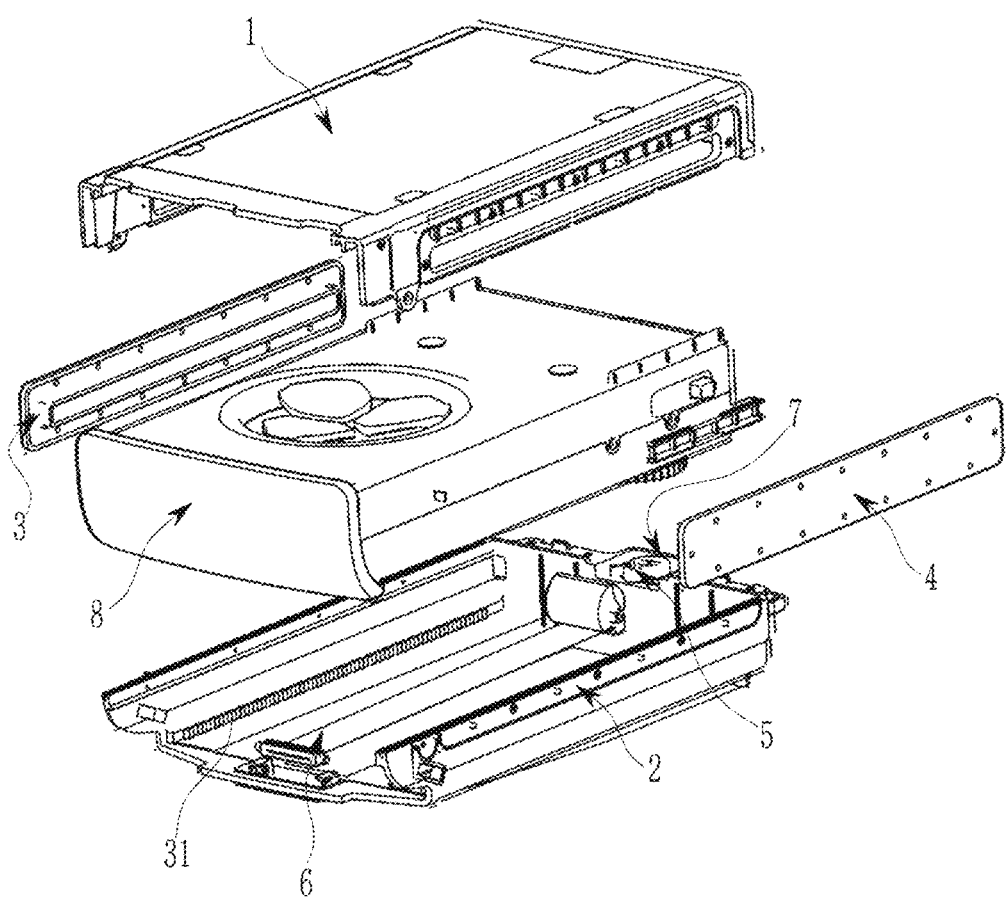
FIG. 9 is a schematic exploded view of the hidden type holder device according to the exemplary embodiment of the present invention.
Figure 10:
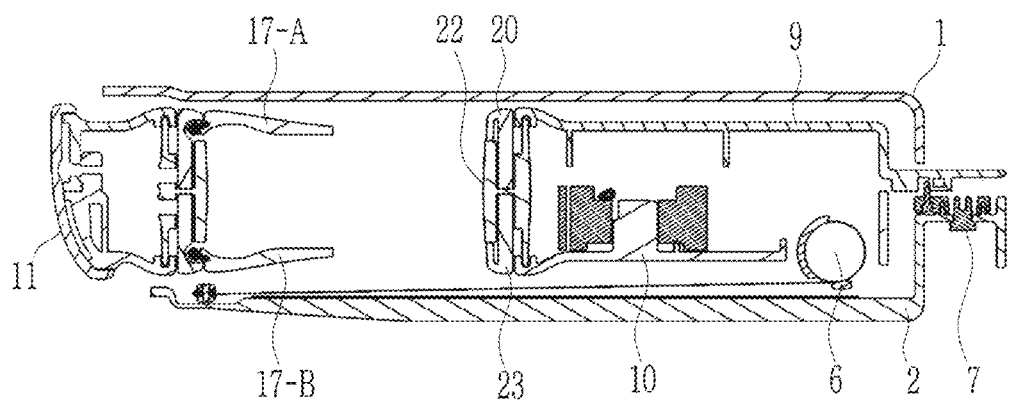
FIG. 10 is a cross-sectional view taken along a cross-sectional line X-X in FIG. 8.

Referring to FIG. 9 and FIG. 10, the hidden type holder device according to the exemplary embodiment of the present invention includes a stationary assembly 5, a movable assembly 8, and a return spring 6. The movable assembly 8 may be accommodated in the stationary assembly and move to the inside and outside of the stationary assembly. The movable assembly 8 has a retractable holder assembly for accommodating an article. Two opposite end portions of the return spring 6 are respectively mounted on the stationary assembly and the movable assembly 8.

The stationary assembly includes stationary covers, rails, and racks 31. The stationary covers include an upper cover 1 and a lower cover 2, and the upper cover 1 and the lower cover 2 cooperatively form a housing for accommodating the movable assembly 8. An opening is formed at a front end portion of the housing. The movable assembly 8 moves to the inside and outside of the housing through the opening. The rails 3 and 4 guide the movement of the movable assembly 8.

The rails 3 and 4 include a left rail 3 and a right rail 4, and the left rail 3 and the right rail 4 are respectively provided at lateral sides of the upper cover 1. The movable assembly 8 has a guide block 12, and the guide block 12 is disposed in a rail groove. In various exemplary embodiments of the present invention, the left rail 3 and the right rail 4 are respectively provided at two opposite left and right sides of the upper cover 1, and rail grooves are respectively provided in the left rail 3 and the right rail 4.

The racks 31 are respectively provided at two opposite sides of the lower cover 2. Optionally, the rack 31 may be provided only at one side of the lower cover 2.

The installation of the left and right rails 3 and 4 and the racks may be changed. For example, the left rail 3 and the right rail 4 may be provided on the lower cover 2, and the rack 31 may be provided on the upper cover 1.

A first end portion of the return spring 6 is provided at a rear side of the movable assembly 8, and a second end portion of the return spring 6 is provided at a front side of the stationary assembly. An elastic force of the return spring 6 pushes the movable assembly 8 forward to move the movable assembly 8 to the outside of the stationary assembly. In various exemplary embodiments of the present invention, the second end portion of the return spring 6 is provided at a front side of the lower cover 2.

Figure 11:
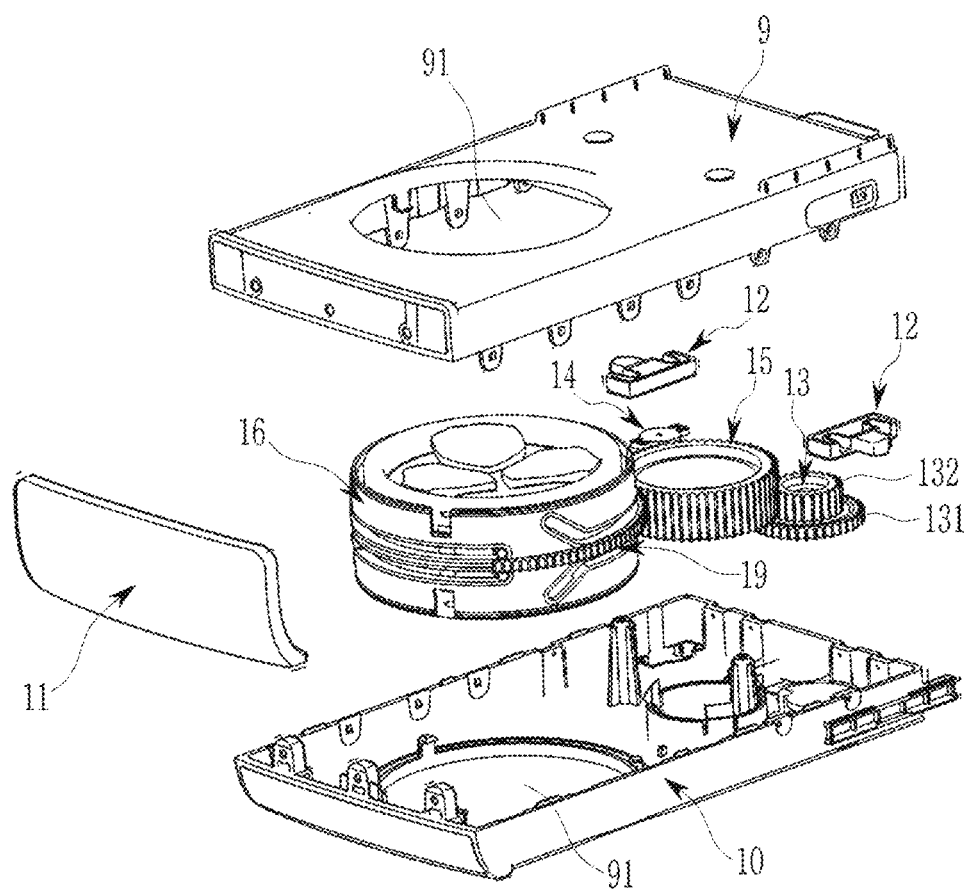
FIG. 11 is a schematic exploded view of a movable assembly.
Figure 12:
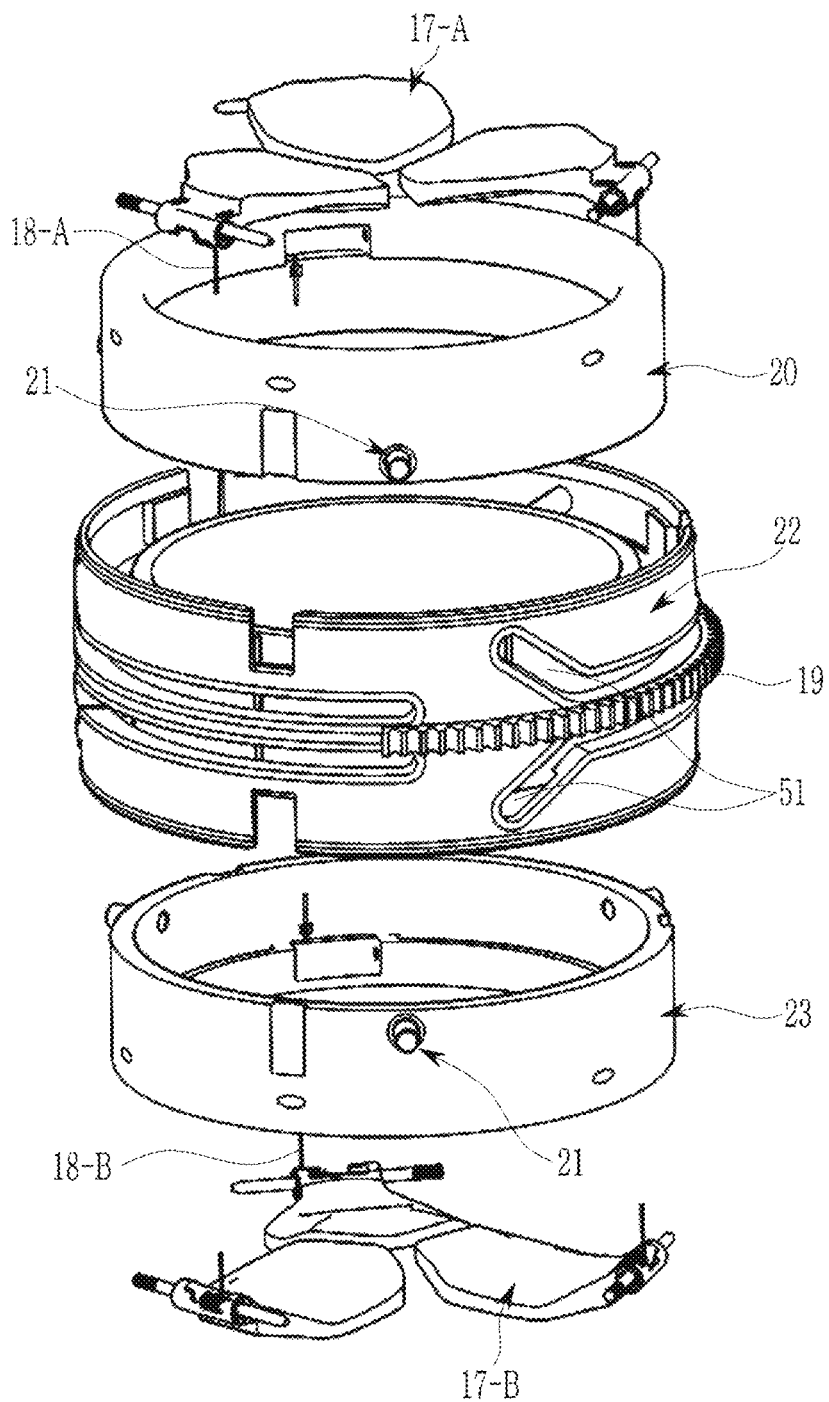
FIG. 12 is a schematic exploded view of the holder device.
Figure 13:
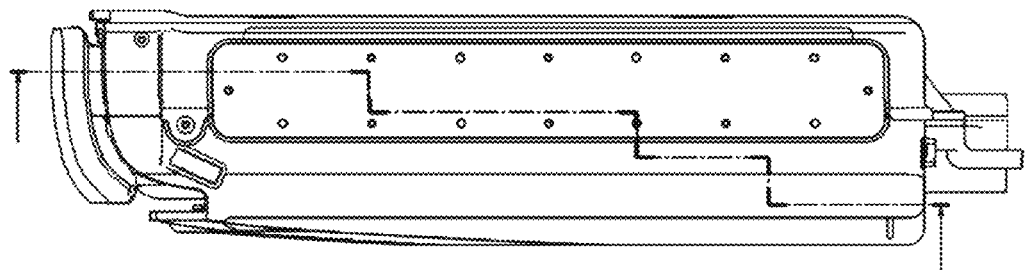
FIG. 13 is a side view of the hidden type holder device according to the exemplary embodiment of the present invention.

Referring to FIG. 11 and FIG. 12, the movable assembly 8 includes a movable housing, a power transmission device, and a holder assembly 16. When the movable assembly 8 moves forward or rearward thereof, the power transmission device transmits power to the holder assembly 16. The movable assembly 8 is provided in a space defined by the upper cover 1 and the lower cover 2 and moved to the outside of the stationary assembly by the operation of the return spring 6.

The movable assembly 8 includes an upper movable cover 9, a lower movable cover 10, a guide block 12, a movable gear 13, a balance gear 14, a rotation gear 15, and a holder assembly 16.

Figure 23:
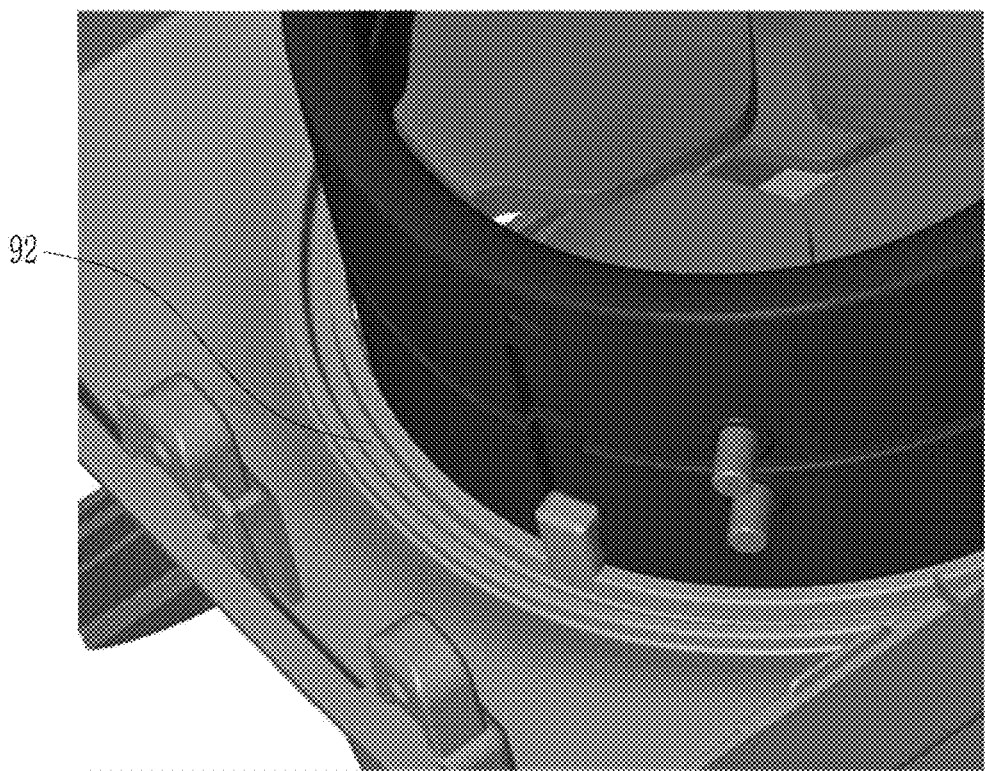
FIG. 23 is a partially enlarged view exemplarily illustrating the holder device from which a holder body is removed.

The upper movable cover 9 and the lower movable cover 10 cooperatively form a movable housing for accommodating the holder assembly 16, the respective gears 13, 14, and 15, and the end portions of the return spring 6. Openings 91 are formed at a front side of the movable housing constituted by the upper movable cover 9 and the lower movable cover 10. An upper retractable portion 20 and a lower retractable portion 23 of a holder body may be extended from the openings 91 formed in the upper movable cover 9 and the lower movable cover 10. Sliding grooves 92 are respectively provided at edge portions of the openings 91 of the upper movable cover 9 and the lower movable cover 10. FIG. 23 illustrates the sliding groove 92 formed at the edge portion of the opening of the lower movable cover 10.

The gears include the movable gear 13, the rotation gear 15, and a ring gear 19. The movable gear 13 engages with the first rack 31 positioned on the stationary assembly, the ring gear 19 is provided on the holder body 22 of the holder assembly, and the rotation gear 15 is located between the movable gear 13 and the ring gear 19.

The movable gear 13 and the rotation gear 15 are rotatably mounted on the upper movable cover 9 and/or the lower movable cover 10 (provided on the lower movable cover 10 in the illustrated exemplary embodiment). The movable gear 13 includes two gear portions, the lower gear portion 131 engages with the rack 31 on the lower cover 2, and the upper gear portion 132 is fixedly coupled to the lower gear portion 131 and engages with the rotation gear 15. The rotation gear 15 engages with the ring gear 19 on the holder body 22 and converts the movement of the movable assembly 8 relative to the stationary assembly into the rotation of the holder body 2 by the respective gears (the present configuration will be described below in detail).

The balance gear 14 may be additionally provided on the movable assembly 8. The balance gear 14 engages with the second rack 31 positioned on the stationary assembly, and the second rack 31 is positioned on the stationary assembly and disposed at a position opposite to the first rack 31. The balance gear 14 is configured to balance a deflection force caused by the engagement between the movable gear 13 and the first rack 31.

The gears are set to convert the movement of the movable assembly 8 relative to the stationary assembly into the rotation of the holder body 22, and the present set of the gears may be changed. For example, the movable gear 13 and the rotation gear 15 may be integrally provided (i.e., one of the movable gear 13 and the rotation gear 15 engages with the first rack 31, and the other of the movable gear 13 and the rotation gear 15 engages with the ring gear 19) such that the number of members may be reduced or the balance gear 14 may not be provided.

The movable assembly 8 further includes an endplate 11, and the endplate 11 is positioned at the front end portion of the movable assembly.

The holder assembly 16 includes the holder body 22, the ring gear 19, the upper retractable portion 20, and the lower retractable portion 23. The holder body 22 is a hollow body. The ring gear 19 is disposed around an external periphery of the holder body 22 and coupled to the power transmission device to move and rotate the holder body 22. The upper retractable portion 20 and the lower retractable portion 23 may move upward or downward relative to the holder body 22. When the movable assembly 8 moves forward, the holder body 22 moves the upper retractable portion 20 and the lower retractable portion 23 upward or downward by being rotated by power transmitted from the power transmission device.

Figure 22:
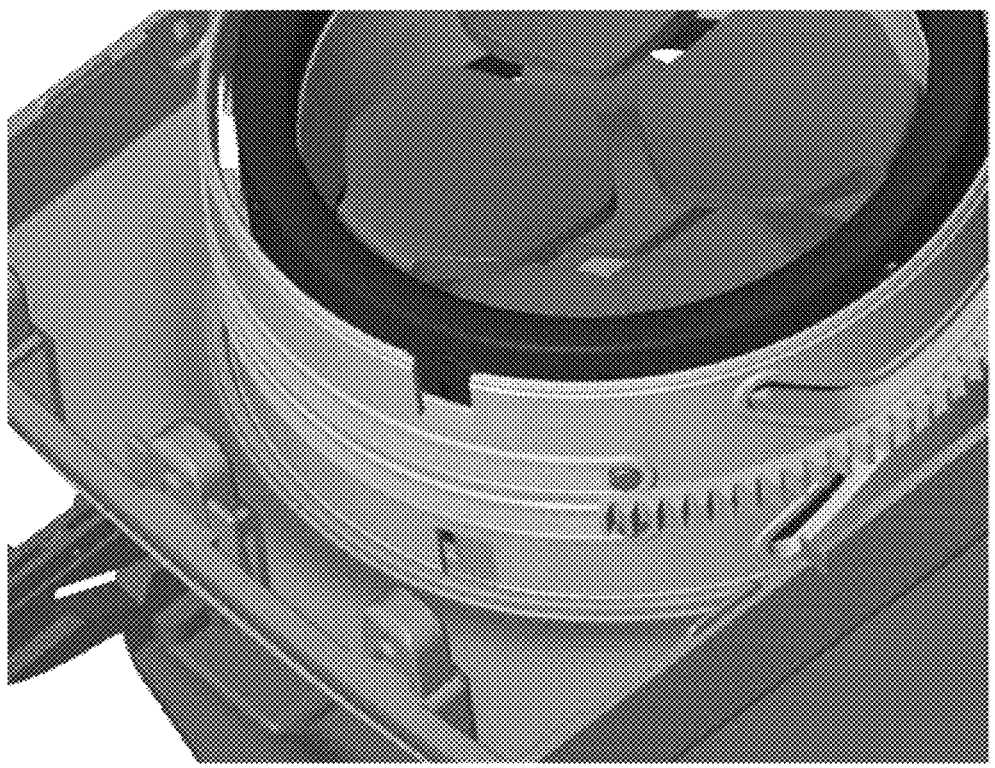
FIG. 22 is a partially enlarged view of the holder device.

The holder body 22 is provided in the space defined by the upper movable cover 9 and the lower movable cover 10. Two opposite upper and lower end portions of the holder body 22 are rotatably mounted in the sliding groove 92 of the upper movable cover 9 and the lower movable cover 10 and may be rotated. FIG. 22 illustrates that the lower end portion of the holder body 22 is mounted in the sliding groove 92 of the lower movable cover 10.

Walls of the holder body 22 are provided in an H shape. That is, the walls include an internal wall and an external wall. Middle portions of the internal wall and the external wall are connected by a cross arm extending horizontally to form two concave grooves respectively opened upward and downward. The upper retractable portion 20 is disposed in the upper concave groove, and the lower retractable portion 23 is provided in the lower concave groove. When the holder body 22 rotates, the upper retractable portion 20 and the lower retractable portion 23 do not rotate relative to the upper movable cover 9 and the lower movable cover 10.

Figure 14:
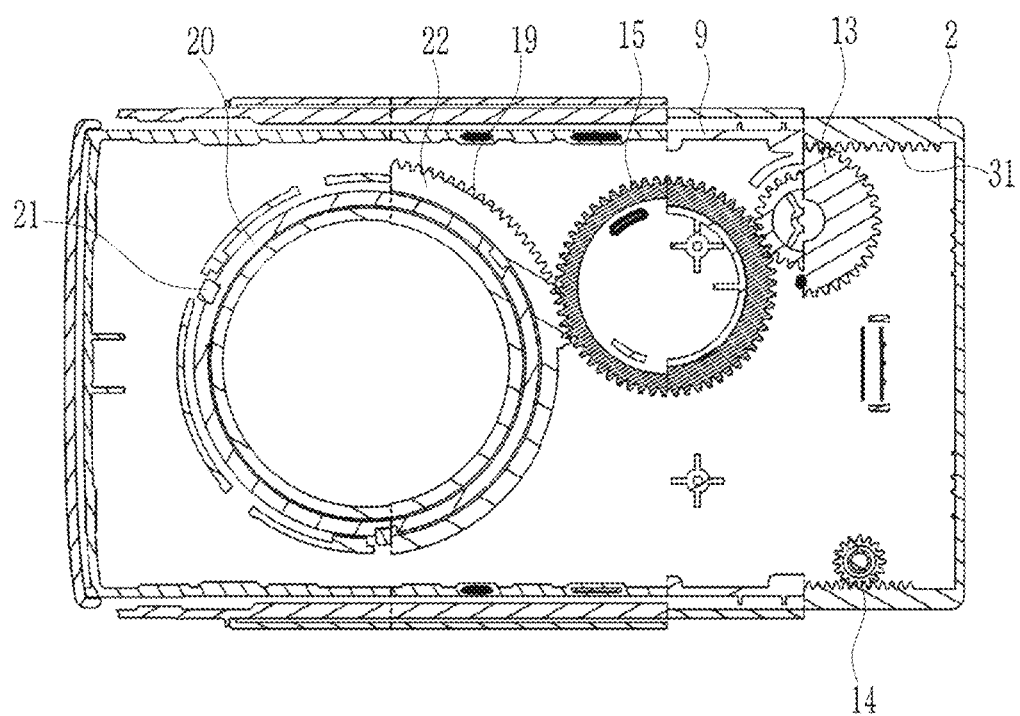
FIG. 14 is a cross-sectional plan view of the hidden type holder device according to the exemplary embodiment of the present invention.
Figure 15:
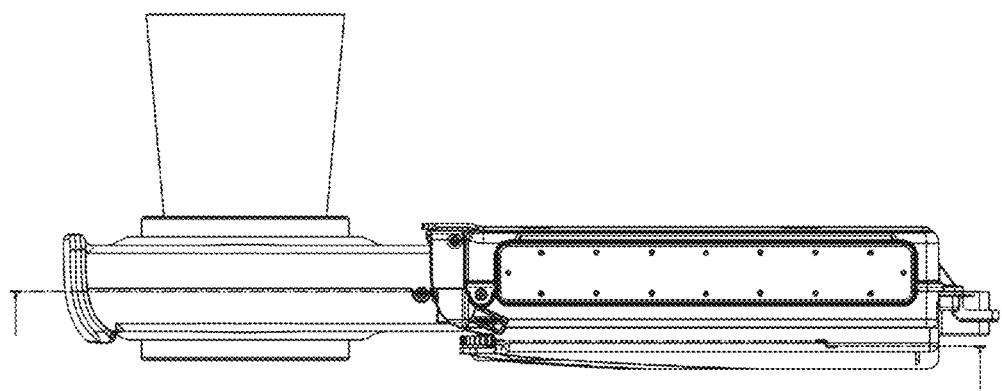
FIG. 15 is a side view exemplarily illustrating a state in which the hidden type holder device according to the exemplary embodiment of the present invention is opened forward and used.
Figure 16:
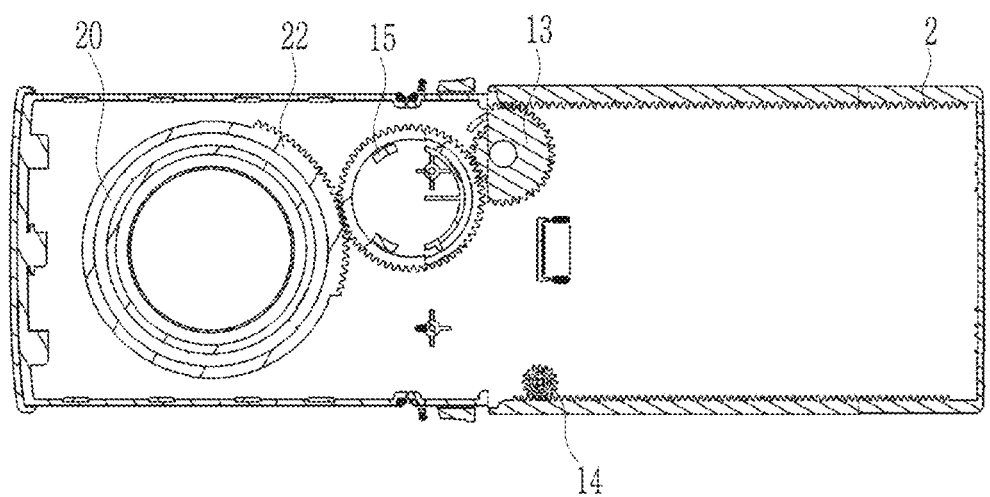
FIG. 16 is a cross-sectional plan view exemplarily illustrating a state in which the hidden type holder device according to the exemplary embodiment of the present invention is opened forward and used.
Figure 17:
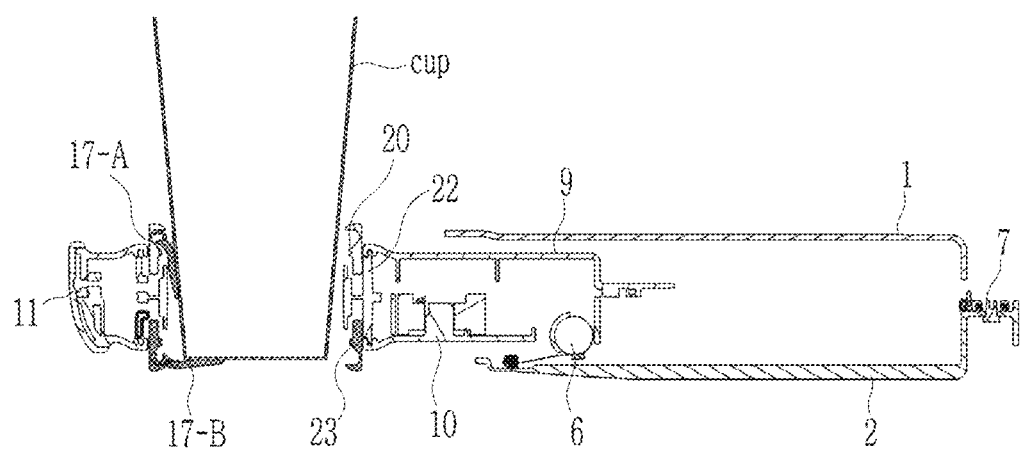
FIG. 17 is a cross-sectional side view exemplarily illustrating a state in which the hidden type holder device according to the exemplary embodiment of the present invention is opened forward and used.
Figure 18:
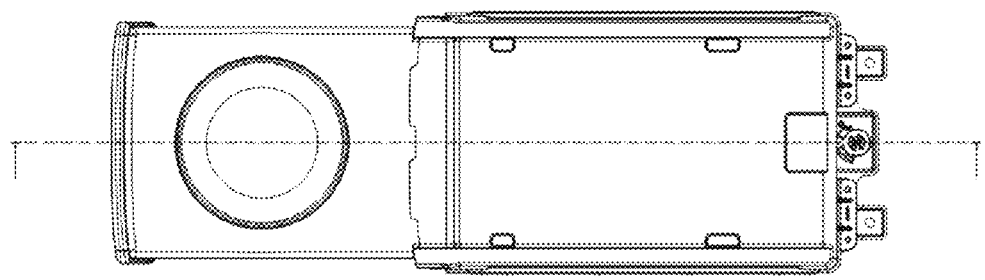
FIG. 18 is a top plan view exemplarily illustrating a state in which the hidden type holder device according to the exemplary embodiment of the present invention is opened forward and used.
Figure 19:
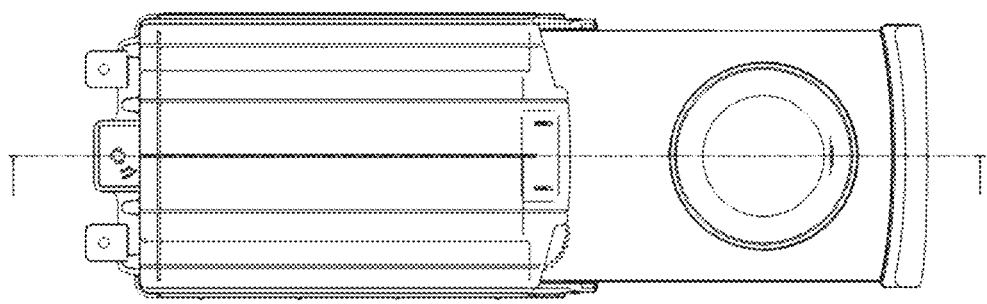
FIG. 19 is a top plan view exemplarily illustrating a state in which the hidden type holder device according to the exemplary embodiment of the present invention is opened rearward and used.
Figure 20:
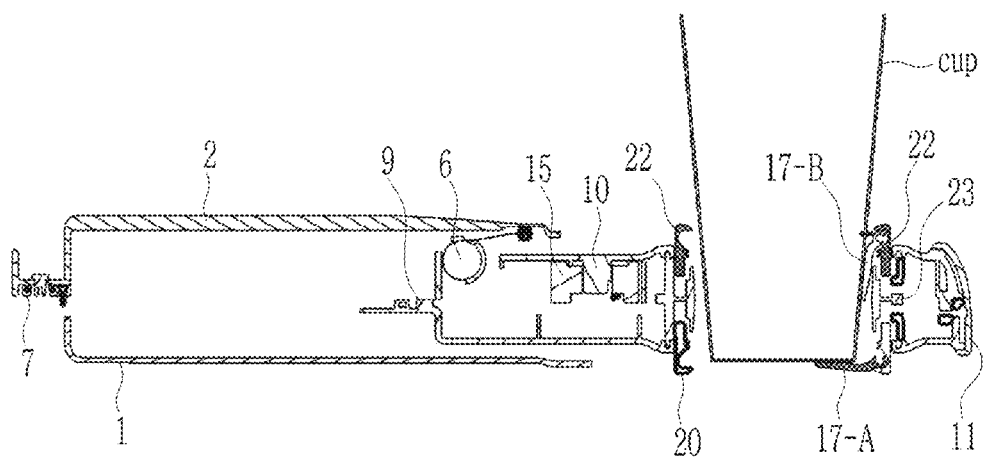
FIG. 20 is a cross-sectional side view exemplarily illustrating a state in which the hidden type holder device according to the exemplary embodiment of the present invention is opened rearward.
Figure 21:
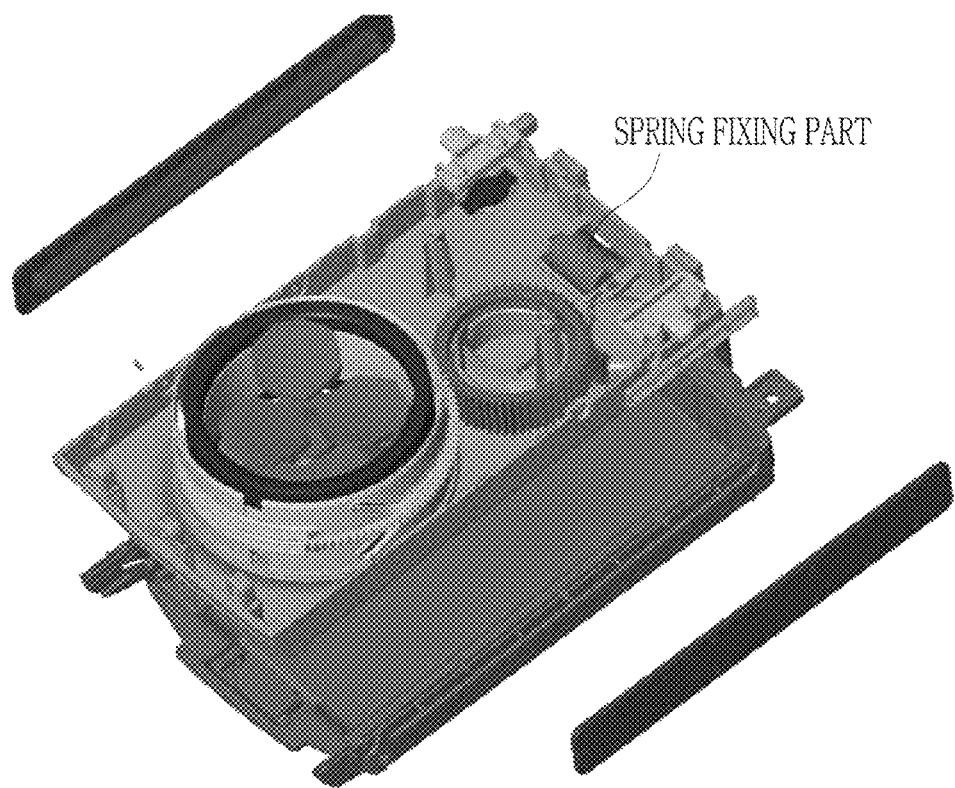
FIG. 21 is a schematic view of the hidden type holder device according to the exemplary embodiment of the present invention, illustrating a state in which an upper movable cover of the movable assembly is removed.

The arc-shaped ring gear 19 is provided around a portion of an external portion of an external wall of the holder body 22, the ring gear 19 engages with the rotation gear 15, and a length of the ring gear 19 is equal to a length of a guide groove 51. When the movable assembly 8 is positioned to be completely accommodated in the stationary assembly, one end portion of the ring gear 19 engages with the rotation gear 15. When the movable assembly 8 is completely moved to the outside, the other end portion of the ring gear 19 engages with the rotation gear 15. As illustrated in FIGS. 14 and 16, the extension angle of the ring gear 19 is 90 degrees or less.

The guide grooves 51 are provided in the wall of the holder body 22, guide pins 21 are respectively provided on the upper retractable portion 20 and the lower retractable portion 23, and the guide pins 21 are respectively disposed in the guide grooves 51. When the holder body 22 rotates, the guide pins 21 and the guide grooves 51 are coupled to move the retractable portions 20 and 23 in an upward/downward direction.

The guide groove 51 includes a horizontal portion and an inclined portion, and the inclined portion is positioned at an end portion of the horizontal portion and inclined from the end portion of the horizontal portion. The retractable portions 20 and 23 include the upper retractable portion 20 and the lower retractable portion 23. The upper retractable portion 20 may be positioned above the holder body 22 and move upward, and the lower retractable portion 23 may be positioned below the holder body 22 and move downward. The guide grooves 51 include an upper guide groove and a lower guide groove. An inclined portion of the upper guide groove is inclined upward, and an inclined portion of the lower guide groove is inclined downward.

In the exemplary embodiment of the present invention, three guide grooves may be provided, and three guide pins 21 may further be provided on the upper retractable portion 20 and the lower retractable portion 23 to correspond to the three guide grooves. The number of guide grooves 51 and the number of guide pins 21 may each be changed within a range of 2 to 8, for example. The number of guide grooves 51 and the number of guide pins 21 may each be three. The guide groove 51 may penetrate or not penetrate the external wall of the holder body 22.

The guide pins 21 are respectively positioned at a point close to a lower edge portion of the upper retractable portion 20 and a point close to an upper edge portion of the lower retractable portion 23 (i.e., respectively positioned at internal sides of the upper retractable portion 2 and the lower retractable portion 23 in a height direction). The guide pin 21 is inserted into the guide groove 51 of the holder body 22. The number of guide pins 21 is equal to the number of guide grooves 51.

When the movable assembly 8 moves to the outside, the holder body 22 is rotated by the movable gear 13 and the rotation gear 15. When the movable assembly 8 is still positioned in the housing in the upper cover 1 and the lower cover 2, the guide pin 21 is positioned at a horizontal portion of the guide groove 51 of the holder body 22. Therefore, even though the holder body 22 rotates, the upper retractable portion 20 and the lower retractable portion 23 are kept at their positions without moving upward or downward. When the movable assembly 8 moves to the outside of the housing defined by the upper cover 1 and the lower cover 2 and thus is positioned outside the housing, the guide pin 21 enters the inclined portion of the guide groove 51 and moves in the upward/downward direction by the rotation of the holder body 22. Therefore, when the upper retractable portion 20 and the lower retractable portion 23 are respectively moved upwardly and downwardly from the openings 91 of the upper movable cover 9 and the lower movable cover 10, a distance between an upper edge portion of the upper retractable portion 20 and a lower edge portion of the lower retractable portion 23 is increased (i.e., an overall height of the holder assembly 16 is increased (see FIG. 17)).

The dimensions of the horizontal portion and the inclined portion of the guide groove 51 need to satisfy the following conditions. When the holder device 16 is not moved to the outside of the stationary assembly, the upper retractable portion 20 and the lower retractable portion 23 need not be moved and extending toward two opposite upper and lower sides. Therefore, the upper retractable portion 20 and the lower retractable portion 23 need not be in contact with the upper cover 1 and the lower cover 2 and need not interfere with the movement of the movable assembly 8. When the holder device 16 is moved to the outside of the stationary assembly, the upper retractable portion 20 and the lower retractable portion 23 need to move toward two opposite upper and lower sides to increase the distance between the upper edge portion of the upper retractable portion 20 and the lower edge portion of the lower retractable portion 23 to more appropriately mount a cup.

The retractable portions 20 and 23 may include folding flaps 17-A and 17-B. The upper folding flap 17-A and the lower folding flap 17-B are respectively positioned at sides opposite to the guide pins 21 of the upper retractable portion 20 and the lower retractable portion 23, i.e., positioned outside the upper retractable portion 20 and the lower retractable portion 23 in the height direction thereof. That is, the upper folding flaps 17-A are disposed above the upper retractable portion 20, and the lower folding flaps 17-B are positioned below the lower retractable portion 23. The present installation may maximize a distance between edge portions of the upper/lower flaps 17-A and 17-B and edge portions of the lower/upper retractable portions 23 and 20. Alternatively, the flaps 17-A and 17-B may be provided at other positions with respect to the upper and lower retractable portions 20 and 23.

As illustrated, three upper folding flaps 17-A and three lower folding flaps 17-B may be provided. However, the number of upper folding flaps 17-A and the number of lower folding flaps 17-B may each be changed within a range of 1 to 8, for example.

The upper folding flap 17-A and the lower folding flap 17-B each include a flap body, a spring, and a hinge shaft. The flap body is rotatably mounted on the upper retractable portion 20 or the lower retractable portion 23 by the hinge shaft. The spring 18-A or 18-B is provided between the flap body and the retractable portion 20 or 23 and applies a restoring force to the flap body. When the flap bodies are disposed at initial positions, all the upper folding flaps 17-A and the lower folding flaps 17-B are disposed at vertical positions. When the flap bodies are unfolded, all the upper folding flaps 17-A and the lower folding flaps 17-B are disposed at horizontal positions. When the upper folding flaps 17-A and the lower folding flaps 17-B are disposed at the horizontal positions, the springs apply the restoring force to the flap bodies.

The upper folding flap 17-A or the lower folding flap 17-B rotates about the hinge shaft, and a rotation angle is about 90 degrees. The lower folding flap 17-B rotates from the vertical position directed upward to the horizontal position directed downward. That is, the lower folding flap 17-B is disposed at the vertical position directed upward in the accommodated state, and the lower folding flap 17-B is disposed at the horizontal position in the unfolded state to accommodate the cup. The upper folding flap 17-A rotates from the vertical position directed downward to the horizontal position directed upwards. That is, the upper folding flap 17-A is disposed at the vertical position directed downwardly in the accommodated state, and the upper folding flap 17-B is disposed at the horizontal position in the unfolded state to accommodate the cup.

In various exemplary embodiments of the present invention, the upper folding flap 17-A and the lower folding flap 17-B are rotatably provided. However, the upper folding flap 17-A and the lower folding flap 17-B may be fixedly provided.

A stopper may be provided on the flap to restrict an additional rotation, when the flap rotates to the horizontal position, mounting the cup.

Figure 24:
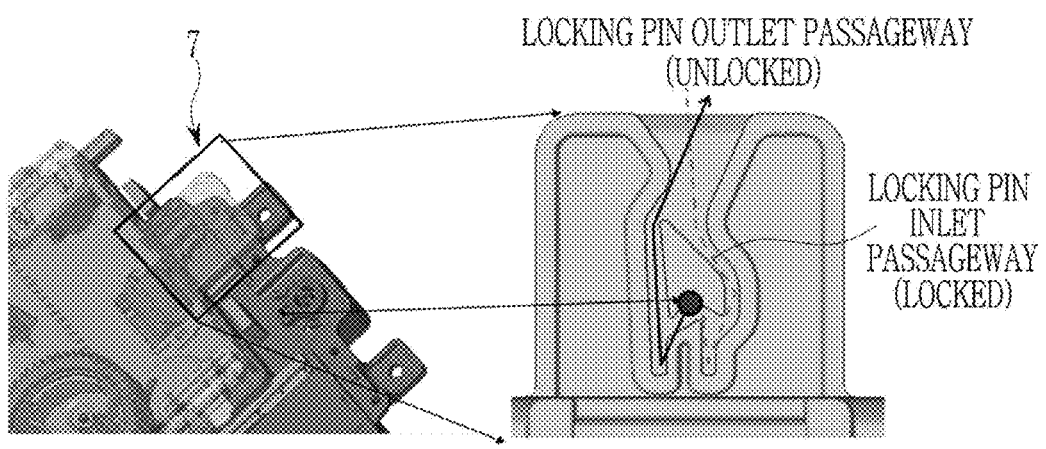
FIG. 24 is a schematic view exemplarily illustrating a locking pin and a locking groove of the hidden type holder device according to the exemplary embodiment of the present invention.

As illustrated in FIGS. 10 and 24, the exemplary embodiment of the present invention may further include a locking device 7, and the locking device 7 includes a locking pin and a locking groove. The locking pin may be disposed at a rear end portion of the stationary assembly, and the locking groove may be disposed at a rear end portion of the movable assembly 8. Of course, the position of the locking pin and the position of the locking groove may be interchanged (i.e., the locking groove may be disposed at the rear end portion of the stationary assembly, and the locking pin may be disposed at the rear end portion of the movable assembly 8).

The locking groove has a locking pin inlet passageway and a locking pin outlet passageway. In FIG. 24, the locking pin inlet passageway is positioned at the right side, and the locking pin outlet passageway is positioned at the left side thereof. When the movable assembly 8 is positioned in the stationary assembly, the locking pin is positioned at a fixed position (a position in the drawing) of the passageway. When an operator pushes the movable assembly rearward thereof, the locking pin is moved to the locking pin outlet passageway by the rear wedge operation, and the movable assembly 8 is moved to the outside of the stationary assembly by the operation of the spring. When the operator pushes the movable assembly 8 rearward at the position at which the movable assembly 8 is moved to the outside, the movable assembly 8 moves into the stationary assembly while overcoming the elasticity of the spring, and in the instant case, the locking pin enters the locking groove through the locking pin inlet passageway. Thereafter, when the operator takes his or her hand off the movable assembly 8, the locking pin is positioned at the fixed point of the locking groove by the operation of the spring and locks the movable assembly 8 in the stationary assembly.

Hereinafter, a process of operating the hidden type holder device according to the exemplary embodiment of the present invention will be described. FIG. 10 illustrates the accommodated state in which the hidden type holder device according to the exemplary embodiment of the present invention is not used. That is, the movable assembly 8 is positioned in the stationary assembly. The user pushes the endplate 11 to use the holder device according to the exemplary embodiment of the present invention. When an external force is applied to the endplate 11, the locking device 7 unlocks the movable assembly 8. In a state in which the elasticity of the spring is applied, the movable assembly 8 moves to the outside, and the movable gear 13 engages with the ring gear 19 and rotates the holder body 22. When the movable assembly 8 is positioned in the stationary assembly, the guide pin 21 is positioned in the horizontal portion of the guide groove 51 such that the holder body 22 rotates, but the upper retractable portion 20 and the lower retractable portion 23 do not move. Once the movable assembly 8 moves to the outside of the stationary assembly, the guide pin 21 enters the inclined portion of the guide groove 51, the guide pin 21 moves upward or downward along the inclined portion of the guide groove 51, moving the upper retractable portion 20 or the lower retractable portion 23 upward or downward. When the guide block 12 of the movable assembly 8 comes into contact with the end portion of the rail groove and is fixed in position, the movement of the movable assembly 8 is stopped, and outward extension of the upper retractable portion 20 and the lower retractable portion 23 is further stopped. In the instant case, the distance between the upper and lower edge portions of the upper retractable portion 20 and the lower retractable portion 23 is maximized such that the cup may be stably mounted.

To retract and accommodate the movable assembly 8 in the stationary assembly, the movable assembly 8 is pushed inward until the locking pin is positioned at the fixed point of the locking groove, and the movable assembly 8 is kept in a standby state.

When a passenger accommodated in the rear seat intends to use the hidden type holder device according to various exemplary embodiments of the present invention embodiment, the passenger may rotate the hidden type holder device rearward by 180 degrees so that the upper cover 1 of the stationary assembly is positioned at the lower side and the lower cover 2 is positioned at the upper side thereof. Thereafter, the passenger pushes the endplate 11 to move the movable assembly 8 to the outside. The above-mentioned process may apply to the following process.

The exemplary embodiment of the present invention includes the retractable portions including the upper retractable portion 20 and the lower retractable portion 23. Furthermore, the upper retractable portion 20 and the lower retractable portion 23 respectively include the upper folding flaps 17-A and the lower folding flaps 17-B. However, the exemplary embodiment of the present invention is not limited thereto and may be modified, as necessary. When it is not necessary to reverse the hidden type holder device, the setting of the retractable portion and the folding flap may be changed. For example, the retractable portions according to various exemplary embodiments of the present invention include the upper retractable portion 20 and the lower retractable portion 23. However, the lower folding flap 17-B may be provided only on the lower retractable portion 23. As various exemplary embodiments of the present invention, only the lower retractable portion 23 may be provided without mounting the upper retractable portion 20, and the lower folding flap 17-B may be provided on the lower retractable portion 23. As yet another example, only the upper retractable portion 20 may be provided without mounting the lower retractable portion 23, and the lower folding flap 17-B may be provided at the lower side of the holder body.

In the exemplary embodiment of the present invention, the cup has been referred to as an article to be mounted on the hidden type holder. However, the exemplary embodiment of the present invention is not limited to the configuration for mounting the cup and may mount other articles or other containers such as water bottles for accommodating a liquid.

In the exemplary embodiment of the present invention, the configuration has been described in which the hidden type holder device is applied to the vehicle. However, the exemplary embodiment of the present invention may be applied to other locations such as trains, passenger ships, and airplanes. Furthermore, the exemplary embodiment of the present invention is not limited to the configuration in which the hidden type holder device is mounted on the armrest of the transportation means, but the hidden type holder device may be mounted at other positions.

To better interpret and accurately define the appended claims, and the terms "upper", "lower", "inner", "outer", "upper surface", "lower surface", "upper side", "lower side", "upward", "downward", "front", "rear", "back", "inner side", "external side", "inward", "outward", "inner portion", "external portion", "inner", "outer", "forward", and "rearward" are intended to explain the features of the exemplary embodiment with reference to the positions of the features illustrated in the drawings. In the application document of the present invention, all the terms "front", "rear", "left", and "right" indicate positions determined with respect to the user. For example, the term "front" means a direction toward the front side of the user, and the term "rear" means a direction toward the rear side of the user.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A holder apparatus comprising:
   a stationary assembly, a movable assembly, and a first return spring,
   wherein the movable assembly is accommodated in the stationary assembly and movable to the inside or outside of the stationary assembly,
   wherein the movable assembly has a retractable holder assembly for accommodating an article, and
   wherein first and second end portions of the first return spring are mounted on the stationary assembly and the movable assembly, respectively,
   wherein the stationary assembly includes stationary covers, rails, and racks,
   wherein the stationary covers include an upper cover and a lower cover, and the upper cover and the lower cover form a housing for accommodating the movable assembly,
   wherein an opening is provided at a front end portion of the housing, and the movable assembly is movable to the inside or outside of the housing through the opening, and
   wherein the rails guide movement of the movable assembly.

2. The holder apparatus of claim 1,
   wherein the rails include a first rail and a second rail, and the first rail and the second rail are provided at lateral sides of the upper cover,
   wherein the racks are provided on at least one side of the lower cover, and
   wherein each of the rails includes a rail groove, the movable assembly has a guide block, and the guide block is disposed in the rail groove.

3. The holder apparatus of claim 1, wherein the first end portion of the first return spring is provided at a rear side of the movable assembly, the second end portion of the first return spring is provided at a front side of the stationary assembly, and the first return spring is elastically biased to push the movable assembly forward to move the movable assembly to the outside of the stationary assembly.

4. The holder apparatus of claim 1,
   wherein the movable assembly includes a movable housing, a power transmission device, and the retractable holder assembly, and
   wherein when the movable assembly moves forward or rearward, the power transmission device transmits power to the retractable holder assembly.

5. The holder apparatus of claim 4, wherein the movable housing includes an upper movable cover and a lower movable cover, and the power transmission device and the retractable holder assembly are accommodated in the movable housing.

6. The holder apparatus of claim 4,
   wherein the power transmission device includes a movable gear, a rotation gear, and a ring gear, and
   wherein the movable gear is engaged with a first rack positioned on the stationary assembly, the ring gear is provided on a holder body of the retractable holder assembly, and the rotation gear is located between and engaged to the movable gear and the ring gear.

7. The holder apparatus of claim 6, wherein the movable assembly further includes a balance gear, the balance gear is engaged with a second rack positioned on the stationary assembly, and the second rack is positioned at a place on the stationary assembly opposite to the first rack.

8. The holder apparatus of claim 4, wherein the movable assembly further includes an endplate, and the endplate is positioned at a front end portion of the movable assembly.

9. The holder apparatus of claim 4,
   wherein the retractable holder assembly includes a holder body, a ring gear, and retractable portions,
   wherein the holder body is a hollow body,
   wherein the ring gear is disposed around an external periphery of the holder body and coupled to the power transmission device to rotate the holder body, and
   wherein the retractable portions are movable upward or downward relative to the holder body, respectively, and
   wherein when the movable assembly moves forward, the holder body moves the retractable portions upward or downward by being rotated by power transmitted from the power transmission device.

10. The holder apparatus of claim 9,
    wherein the holder body has guide grooves,
    wherein the retractable portions have guide pins, and
    wherein the guide pins are engaged in the guide grooves, and
    wherein when the holder body rotates, the guide pins and the guide grooves are engaged to move the retractable portions in an upward direction or a downward direction thereof.

11. The holder apparatus of claim 10,
    wherein each of the guide grooves includes a horizontal portion and an inclined portion, and the inclined portion is positioned at an end portion of the horizontal portion and inclined from the end portion of the horizontal portion.

12. The holder apparatus of claim 11,
    wherein the retractable portions include an upper retractable portion and a lower retractable portion, the upper retractable portion is positioned above the holder body and movable upward, and the lower retractable portion is positioned below the holder body and movable downward, and
    wherein the guide grooves include an upper guide groove and a lower guide groove, an inclined portion of the upper guide groove is inclined upward, and an inclined portion of the lower guide groove is inclined downward.

13. The holder apparatus of claim 12, wherein each of the retractable portions includes a folding flap.

14. The holder apparatus of claim 13, wherein the folding flap has a stopper and a second return spring.

15. The holder apparatus of claim 14,
wherein the second spring includes an upper return spring and a lower return spring,
wherein the upper retractable portion includes an upper folding flap,
wherein the upper folding flap is bent downward and positioned at a horizontal position by upward elasticity of the upper return spring, and
wherein the lower retractable portion includes a lower folding flap, and the lower folding flap is bent upward and positioned at a horizontal position by downward elasticity of the lower return spring.

16. The holder apparatus of claim 9, wherein the movable housing has a sliding groove, and the holder body is mounted in the sliding groove and rotatable relative to the sliding groove.

17. The holder apparatus of claim 1, further including a locking device, wherein the locking device includes a locking pin and a locking groove, the locking pin is provided on one of the stationary assembly and the movable assembly, and the locking groove is provided on a remaining one of the stationary assembly and the movable assembly.

18. A vehicle armrest including the holder device of claim 1.

19. A transportation means including the holder device of claim 1.

* * * * *